Patented Aug. 26, 1941

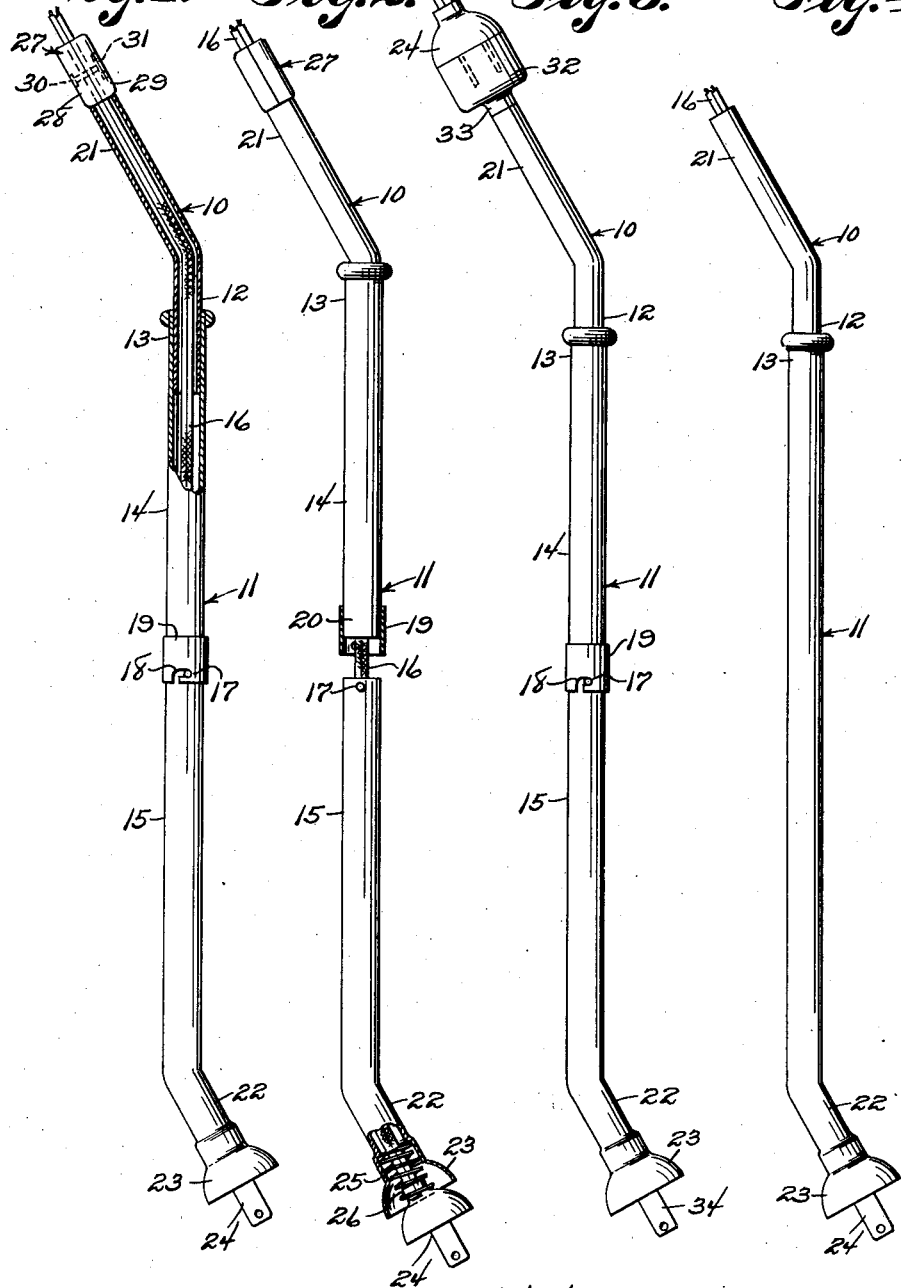

2,253,668

UNITED STATES PATENT OFFICE 2,253,668

STIFFENING ATTACHMENT FOR APPLIANCE CORDS

Walter A. Weddle, Roanoke, Va.

Application October 30, 1939, Serial No. 302,060

7 Claims. (Cl. 174—69)

My invention relates broadly to electric appliances, and more particularly to a stiffening attachment for appliance cords.

An important object of my invention is to provide a stiffening attachment that may be removably associated with an appliance cord to facilitate the insertion of the male plug carried thereby into a female receptacle.

Another object of my invention is to provide a stiffening attachment of the above-mentioned character that has particular utility where the receptacle is in a substantially inaccessible place.

Still another object of my invention is the provision of a stiffening attachment for an appliance cord that is simple and efficient in operation, inexpensive to manufacture and efficacious in the performance of its duties.

Other objects and advantages of my invention, will be apparent during the course of the following description.

In the drawing, forming a part of this specification, and in which like numerals are employed to designate like parts throughout the same, Figure 1 is a side elevation of a device embodying my invention, showing parts broken away and illustrating the same in the extended position, Figure 2 is a side elevation of my device, showing parts in section and parts in elevation and illustrating the same in the retracted position, Figure 3 is a side elevation of a modified form of the invention, and Figure 4 is a side elevation of still another modification of the invention.

In the accompanying drawing, wherein for the purpose of illustration, is shown a preferred embodiment of my invention, the numerals 10 and 11 designate telescoping tubular members wherein the end 12 of the member 10 is slidably disposed within the end 13 of the member 11. The member 11 preferably comprises abutting sections 14 and 15 to facilitate the insertion and removal of the appliance cord 16 which extends through both of the members 10 and 11. The section 15 is formed with projecting pins 17 at diametrically opposed sides thereof adapted to be received by the offset slot 18 in the ferrule 19 which is fixedly carried by the end 20 of the section 14.

The free ends 21 and 22 of the members 10 and 11 are angularly offset in opposite directions and the end 22 of the member 11 is formed with an enlarged cupular socket portion 23 adapted to snugly but detachably receive the conventional male plug 24 carried by the free end of the cord 16. A coil spring 25 is seated within the cupular portion 23 and engages the neck 26 of the male plug to normally hold the same spaced away from the socket.

A stop element 27 is adapted to be removably applied to the cord 16 adjacent the free end 21 of the member 10 and comprises companion shell sections 28 and 29 formed with registering bores to receive the bolt 30 and nut 31. The bolt and nut 30 and 31 hold the sections of the stop element in tight pressed engagement with the cord and in abutting relation with the free end 21 of the member 10.

The resilient action of the coil spring 25 will normally position the male plug 24 spaced away from the socket 23 and the stop element 27 in abutting engagement with member 10 so that when the said plug is received by a female receptacle there will normally be a short length of the flexible appliance cord between the socket and the cupular portion 23, thereby permitting the attachment to assume an unobstructive horizontal position. When it is desired to insert or remove the plug 24 from the receptacle the sections 10 and 11 are extended, as illustrated in Figure 1, to pull the socket 25 into a snugly seated engagement with the cupular portion 23. It is obvious that the stop element 27 will prevent sliding of the cord within the member 10 and that a substantial rigidity will be effected through the lower length of the appliance cord thus greatly facilitating the insertion or removal of the plug from a low or substantially inaccessible receptacle.

As illustrated in Figure 3, it may be desirable to substitute a female receptacle 32 for the stop element 27 and, in that event, the neck 33 of the receptacle is positioned in abutting relation with the free end 21 of the member 10. It will be readily seen that the operation of this form of the invention is precisely the same as that described for the first form, but that it will be unnecessary for the appliance cord 16 to extend through the attachment. In this form a separate length of cord may be disposed within the telescoping members 10 and 11, said cord being connected at one end to the receptacle 13 and at the other end to a plug 34. The plug 24 of the appliance cord may then be inserted in the receptacle 32. When the device is constructed in this manner, it may be easily and expeditiously used in association with a number of appliances, and may be easily carried from place to place.

In Figure 4, I have illustrated a form of the invention wherein both the female receptacle 32 and stop element 27 have been omitted. These elements result in the increased efficiency of the device as a whole and greatly facilitate the mode of operation of the same; however, they are not indispensable and a satisfactory operation may be obtained by omitting the same. To operate the device when constructed in this manner, the user must manually hold the cord 16 at or adjacent to the point at which it enters the member 10 to prevent the same from sliding relative thereto upon extension of the members 10 and 11 to draw the plug 24 into the socket 23. If desired the member 11 may be made in one piece and the form of the invention as illustrated in Figure 4 has been so constructed.

It is to be understood that the form of my invention, herewith shown and described, is to be taken as a preferred example of the same, and that various changes in the size, shape and arrangement of parts, may be resorted to without departing from the spirit of my invention, or scope of the appended claims.

Having thus described my invention, I claim:

1. An attachment comprising relatively slidable telescoping tubular sections, an appliance cord extending through said sections, one of said sections terminating at its free end in an enlarged cupular socket portion, a male plug carried by the appliance cord, spring means seated within the socket portion and engaging the male plug to normally hold the same spaced from the said socket, and a stop element applied to the cord adjacent the free end of the other of the said sections whereby to abuttingly engage therewith when the sections are extended to snugly seat the male plug in the said socket portion.

2. An attachment comprising an extensible tubular body having a socket at one end thereof, an electrical conductor extending through the body, a stop member carried by the cord to abuttingly engage the end of the body remote from the socket to limit the movement of the cord within the body, a male plug connected to the end of the conductor extending through the socket adapted to snugly seat within the socket upon extension of the body, and spring means disposed within the socket and in engagement with the male plug to urge the same in a direction away from the socket whereby the resilient action of the spring means will normally hold the body in a contracted position and will normally position the male plug spaced from the socket to permit the body to be independently movable when the male plug is connected to an electrical outlet.

3. An attachment comprising relatively slidable telescoping tubular sections, one of which sections terminates at its free end in an enlarged cupular socket portion, an appliance cord extending through said sections, a male plug carried by the appliance cord adapted to seat within the socket portion upon extension of the tubular sections, the said plug being normally dissociated from the socket portion but being securely held against independent movement when seated therein.

4. An attachment comprising relatively slidable telescoping tubular sections, one of which sections terminates at its free end in an enlarged cupular socket portion, an appliance cord extending through the said sections, a male plug carried by the appliance cord adapted to snugly seat in the socket portion upon extension of the sections, and a stop element applied to the cord adjacent the free end of the other of the said sections whereby to abuttingly engage therewith when the sections are extended to move the male plug into the said socket portion.

5. An attachment comprising relatively slidable telescoping tubular sections, one of which sections terminates at its free end in an enlarged cupular socket portion, an appliance cord extending through said sections, a male plug carried by the appliance cord, and spring means seated within the socket portion and engaging the male plug to normally hold the same dissociated from the said socket portion, whereby extension of the tubular sections will seat the plug within the socket portion against the resilient action of the spring means to securely hold the same against independent movement.

6. An attachment comprising relatively slidable telescoping tubular sections, one of which sections terminates at its free end in an enlarged cupular socket portion, a flexible electrical conductor extending through said sections, a male plug carried by the end of the conductor extending through the socket portion, and a female receptacle electrically connected to the other end of the said conductor adapted to abuttingly engage one of the sections to seat the male plug within the socket portion upon extension of the said tubular sections.

7. An attachment comprising relatively slidable telescoping tubular sections, one of which sections terminates at its free end in an enlarged cupular socket portion, an electrical conductor extending through said sections, a male plug carried by the end of the conductor extending into the socket portion, a female receptacle attached to the conductor adjacent the free end of the other of the said sections adapted to abuttingly engage therewith when the sections are extended to move the male plug into the said socket portion, and spring means seated within the socket portion and engaging the male plug to normally hold the same spaced from the said socket portion.

WALTER A. WEDDLE.